United States Patent
Wong et al.

(10) Patent No.: US 7,345,813 B2
(45) Date of Patent: Mar. 18, 2008

(54) UV ADJUSTABLE OPTICAL ATTENUATOR

(75) Inventors: Tom Sheau Tung Wong, Singapore (SG); Juay Sim Koh, Singapore (SG); Frank Flens, Singapore (SG); Arjan Van Haasteren, Singapore (SG)

(73) Assignee: Avago Technologies General IP Pte Ltd, Singapore (SG)

( * ) Notice: Subject to any disclaimer, the term of this patent is extended or adjusted under 35 U.S.C. 154(b) by 293 days.

(21) Appl. No.: 11/186,110

(22) Filed: Jul. 21, 2005

(65) Prior Publication Data

US 2007/0019287 A1      Jan. 25, 2007

(51) Int. Cl.
*G02B 5/20* (2006.01)
*F21V 9/06* (2006.01)

(52) U.S. Cl. ............... 359/361; 359/350; 359/614

(58) Field of Classification Search ........ 359/350–361, 359/577–590, 885–892, 601–614
See application file for complete search history.

(56) References Cited

U.S. PATENT DOCUMENTS

| | | | | |
|---|---|---|---|---|
| 4,890,075 A | * | 12/1989 | Pohlmann et al. | 359/886 |
| 5,847,507 A | * | 12/1998 | Butterworth et al. | 313/512 |
| 6,021,520 A | * | 2/2000 | Wang-Lee | 2/8.8 |
| 6,066,844 A | | 5/2000 | Ford et al. | 250/227.21 |
| 6,167,185 A | | 12/2000 | Smiley et al. | 385/140 |
| 6,437,909 B1 | * | 8/2002 | Okamori et al. | 359/361 |
| 6,580,868 B2 | | 6/2003 | Chen et al. | 385/140 |
| 7,005,679 B2 | * | 2/2006 | Tarsa et al. | 257/89 |

FOREIGN PATENT DOCUMENTS

JP                59090805              5/1984

OTHER PUBLICATIONS

English translation of the Japanese reference No. 59-90805.*
Zhou, Ming: "Low-loss polymeric materials for passive waveguide components in fiber optical telecommunication." Optical Engineering, vol. 41, No. 7, Jul. 2002 pp. 1631-1643.

* cited by examiner

*Primary Examiner*—Thong Q Nguyen

(57) ABSTRACT

An optical element includes a light absorbing medium formed of a transparent material and light absorbing elements encapsulated within the transparent material. The light absorbing elements have an ultraviolet (UV) light-dependent absorption characteristic and UV light is applied to the light absorbing medium to change the attenuation of the light absorbing medium to a desired attenuation. UV light is applied to the light absorbing medium in a controlled manner to change the attenuation of the light absorbing medium from an initial attenuation to the desired attenuation. The application of UV light to the light absorbing medium can cause the light absorbing elements encapsulated within the light absorbing medium to degrade such that the amount of light absorbed by the light absorbing medium is reduced. Reducing the amount of light that is absorbed effectively reduces the attenuation of the light absorbing medium.

20 Claims, 6 Drawing Sheets

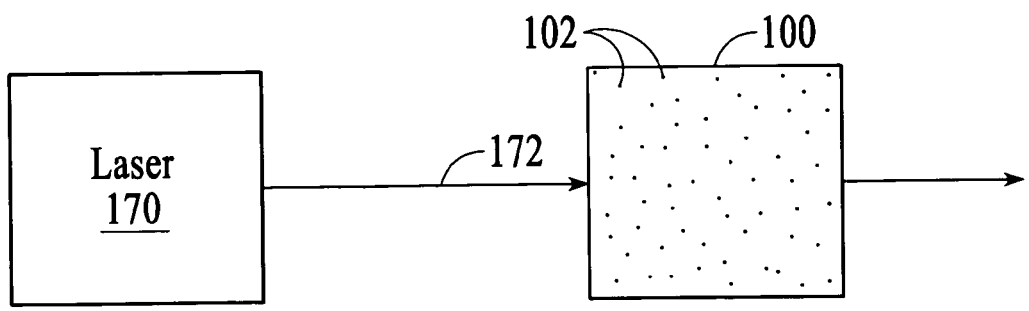
FIG.5
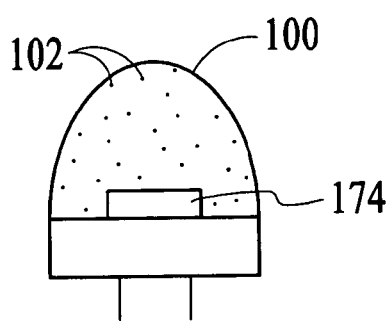    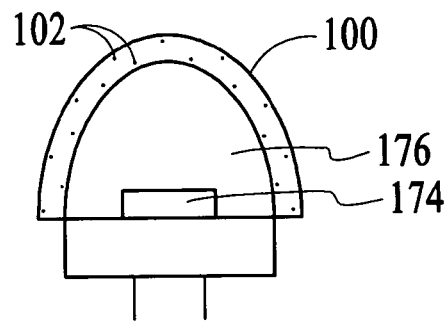
FIG.6              FIG.7
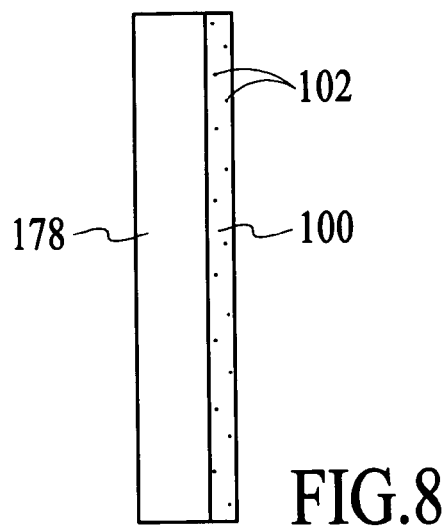
FIG.8

UV ADJUSTABLE OPTICAL ATTENUATOR

BACKGROUND OF THE INVENTION

One way to reduce the intensity of a light beam is to pass the light beam through a light absorbing medium. The intensity of the exiting light beam can be controlled by selecting a light absorbing medium with the desired attenuation. Light absorbing mediums having fixed attenuation are well known in the optics field.

While using a light absorbing medium with a fixed attenuation is an effective way to control the intensity of a light beam in a static and/or predictable environment, optical systems such as lasers, light emitting diodes (LEDs), liquid crystal displays (LCDs), and charged coupled devices (CCDs) often have dynamic and/or unpredictable optical characteristics. The dynamic and/or unpredictable nature of many optical systems can make it difficult to effectively control the optical systems using light absorbing mediums with fixed attenuation properties. For example, as the output characteristic of an LED or LCD panel degrades, an installed light absorbing medium with a fixed attenuation may no longer provide the ideal attenuation for the system. Additionally, because LEDs from the same batch do not always have the same optical output, light absorbing mediums with different attenuation properties may need to be matched with LEDs on a per-LED basis to produce a batch of LED based products with the same optical characteristics.

In view of this, what is needed an optical element with an attenuation that can efficiently be adjusted to meet the needs of a specific application.

SUMMARY OF THE INVENTION

An optical element includes a light absorbing medium formed of a transparent material and light absorbing elements encapsulated within the transparent material. The light absorbing elements have an ultraviolet (UV) light-dependent absorption characteristic and UV light is applied to the light absorbing medium to change the attenuation of the light absorbing medium to a desired attenuation. In an embodiment, the application of UV light to the light absorbing medium causes the light absorbing elements encapsulated within the light absorbing medium to degrade such that the amount of light absorbed by the light absorbing medium is reduced. Reducing the amount of light that is absorbed effectively reduces the attenuation of the light absorbing medium.

In an embodiment, UV light is applied to the light absorbing medium in a controlled manner to change the attenuation of the light absorbing medium from an initial attenuation to the desired attenuation. A system for changing the attenuation of a light absorbing medium from an initial attenuation to the desired attenuation includes a light source, a light detector, a controller, and a UV light source.

Other aspects and advantages of the present invention will become apparent from the following detailed description, taken in conjunction with the accompanying drawings, illustrated by way of example of the principles of the invention.

BRIEF DESCRIPTION OF THE DRAWINGS

FIG. 5 depicts a light absorbing medium with a UV light-dependent light absorption characteristic that is used in conjunction with a laser.

FIG. 6 depicts a light absorbing medium with a UV light-dependent absorption characteristic that is used in conjunction with an LED.

FIG. 7 depicts an alternative embodiment of a light absorbing medium with a UV light-dependent absorption characteristic that is used in conjunction with an LED.

FIG. 8 depicts a light absorbing medium with a UV light-dependent absorption characteristic that is used in conjunction with an LCD panel.

Throughout the description similar reference numbers may be used to identify similar elements.

DETAILED DESCRIPTION

Figure 1:
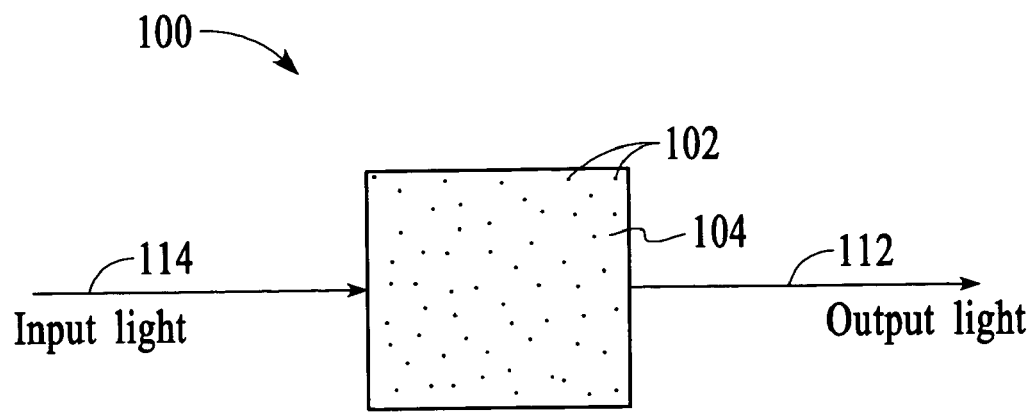
FIG. 1 depicts a light absorbing medium that has a UV light-dependent absorption characteristic.

FIG. 1 depicts a light absorbing medium 100 that has a UV light-dependent absorption characteristic. The light absorbing medium can be formed by mixing light absorbing elements 102 into a transparent material 104 while the transparent material is in a liquid state. The mixture of the transparent material and the light absorbing elements is then cured into a solid state to form the light absorbing medium. The transparent material that is used to form the light absorbing medium can be any transparent material that can be mixed with light absorbing elements and then cured into a solid state. Example transparent materials include acrylics and epoxy. As used herein, the terms "transparent" and "transparent material" mean a material that is pervious to light or a material through which light can pass. "Transparent" and "transparent material" does not necessarily mean that light passes through the material such that objects or images can be seen as if there is no intervening material. That is, a material is considered transparent even if there is some diffusing of light within the material. As used herein, a transparent material includes a translucent material.

The light absorbing elements 102 that are encapsulated within the transparent material 104 have a characteristic that is sensitive to UV light. In an embodiment, the light absorbing elements have an optical absorption characteristic that is permanently altered as a result of exposure to UV light.

Examples of light absorbing elements include ink and colored powder dye. When encapsulated into the transparent material, the sensitivity of the light absorbing elements to UV light causes the light absorbing medium 100 to exhibit a UV light-dependent absorption characteristic. Changes in the absorption characteristic of the light absorbing medium are manifested as different attenuation levels when light is passed through the light absorbing medium. In an embodiment, the changes in the absorption characteristic of the light absorbing medium are permanent changes because the alterations caused by UV light exposure are not reversible.

Figure 2:
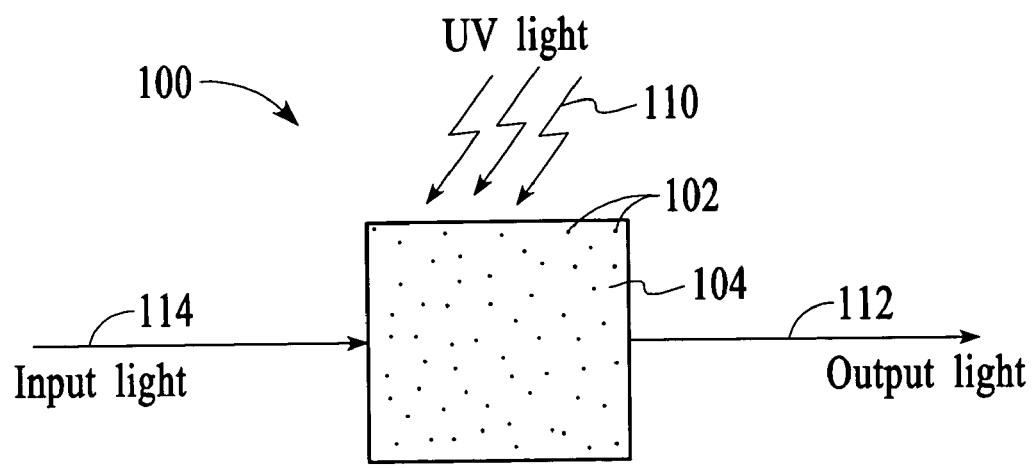
FIG. 2 depicts the application of UV light to the light absorbing medium of FIG. 1 to change the attenuation of the light absorbing medium to a desired attenuation.

In accordance with an embodiment of the invention, UV light is applied to the light absorbing medium 100 depicted in FIG. 1 to change the attenuation of the light absorbing medium to a desired attenuation. FIG. 2 depicts the application of UV light 110 to the light absorbing medium to change the attenuation of the light absorbing medium to the desired attenuation. In an embodiment, the application of UV light to the light absorbing medium causes the light absorbing elements 102 encapsulated within the transparent material 104 to degrade such that the amount of light absorbed by the light absorbing medium is reduced. Reducing the amount of light that is absorbed effectively reduces the attenuation of the light absorbing medium. For example, referring to FIGS. 1 and 2, the intensity of light output 112 from the light absorbing medium will be greater after the application of UV light.

Figure 3A:
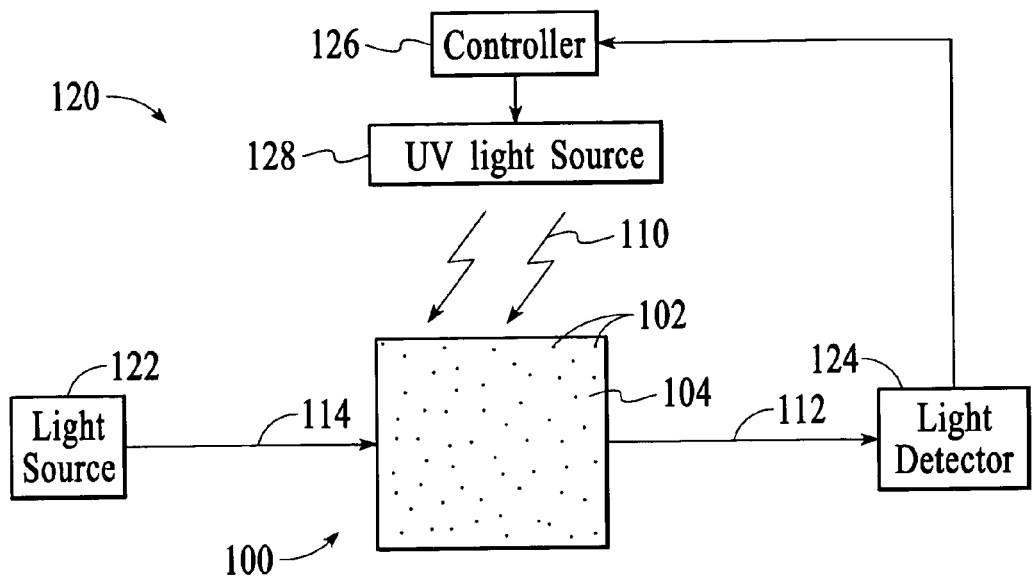
FIG. 3A depicts an embodiment of a system that can be used to change the attenuation of a light absorbing medium from an initial attenuation to a desired attenuation.

In an embodiment, UV light is applied to the light absorbing medium in a controlled manner to change the attenuation of the light absorbing medium from an initial attenuation to the desired attenuation. FIG. 3A depicts an embodiment of a system 120 that can be used to change the attenuation of a light absorbing medium 100 from an initial attenuation to the desired attenuation. The system includes a light source 122, a light detector 124, a controller 126, and a UV light source 128. In operation, light 114 from the light source is directed into the light absorbing medium and light 112 that exits the light absorbing medium is measured by the light detector. The intensity measurement is provided to the controller. The controller compares the measured light intensity to a desired light intensity and the output of the UV light source is controlled in response to the comparison. In an embodiment, UV light 110 is applied to the light absorbing medium until the intensity of the output light has increased to the desired intensity. Once the intensity of the output light reaches the desired intensity, the application of UV light is stopped. In an embodiment, the attenuation of the light absorbing medium can be adjusted in a step-wise manner by applying UV light in distinct intervals and measuring the intensity of the output light after each distinct interval. Alternatively, UV light is continuously applied to the light absorbing medium until the measured light intensity matches the desired light intensity.

Figure 3B:
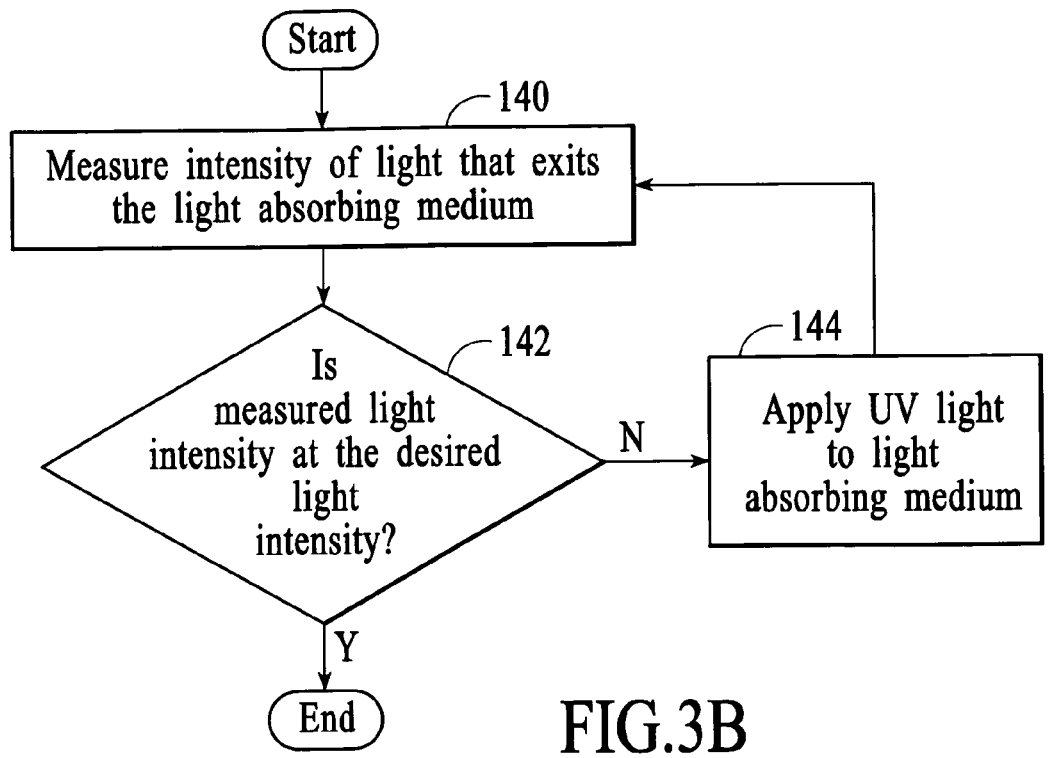
FIG. 3B depicts a process flow diagram of a method for setting the attenuation of a light absorbing medium as depicted in FIG. 3A.

A process flow diagram of a method for setting the attenuation of a light absorbing medium is provided in FIG. 3B. The process described with reference to FIG. 3B can be applied to the system of FIG. 3A. At block 140, the intensity of the light that exits a light absorbing medium is measured. At decision point 142, it is determined if the measured light intensity is at the desired intensity. If the measured intensity is at the desired intensity, then the process is ended and no more UV light is applied to the light absorbing medium. If the measured intensity is not at the desired intensity, then at block 144 more UV light is applied to the light absorbing medium and the process returns to block 140. UV light can be continuously applied to the light absorbing medium or applied in a step-wise manner.

Figure 4A:
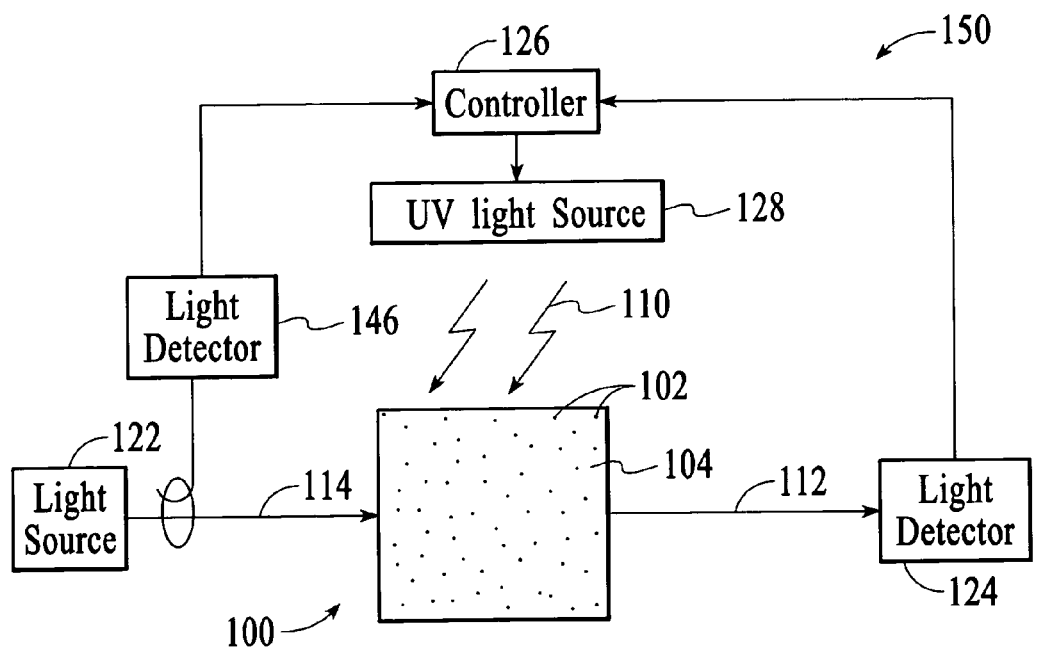
FIG. 4A depicts another embodiment of a system that can be used to change the attenuation of a light absorbing medium from an initial attenuation to a desired attenuation.

FIG. 4A depicts another embodiment of a system 150 that can be used to change the attenuation of a light absorbing medium 100 from an initial attenuation to the desired attenuation. The system of FIG. 4A is similar to the system of FIG. 3A except that the system is configured to measure the intensity of the light before entering the light absorbing medium. Measuring the light intensity upon input and output allows the attenuation of the light absorbing medium to be quantified. In operation, light 114 from the light source 122 is directed towards the light absorbing medium. An input intensity measurement is obtained by the input light detector 146 and then provided to the controller 126. Light 112 that exits the light absorbing medium is measured by the output light detector 124 and the output intensity measurement is provided to the controller. The controller uses both the input and output light intensity measurements to determine the attenuation of the light absorbing medium. The application of UV light 110 to the light absorbing medium is then adjusted by the controller in response to the determined attenuation. In an embodiment, the application of UV light is continued until the attenuation of the light absorbing medium reaches the desired attenuation. UV light can be applied to the light absorbing medium continuously or in a step-wise manner until the light absorbing medium reaches the desired attenuation.

Figure 4B:
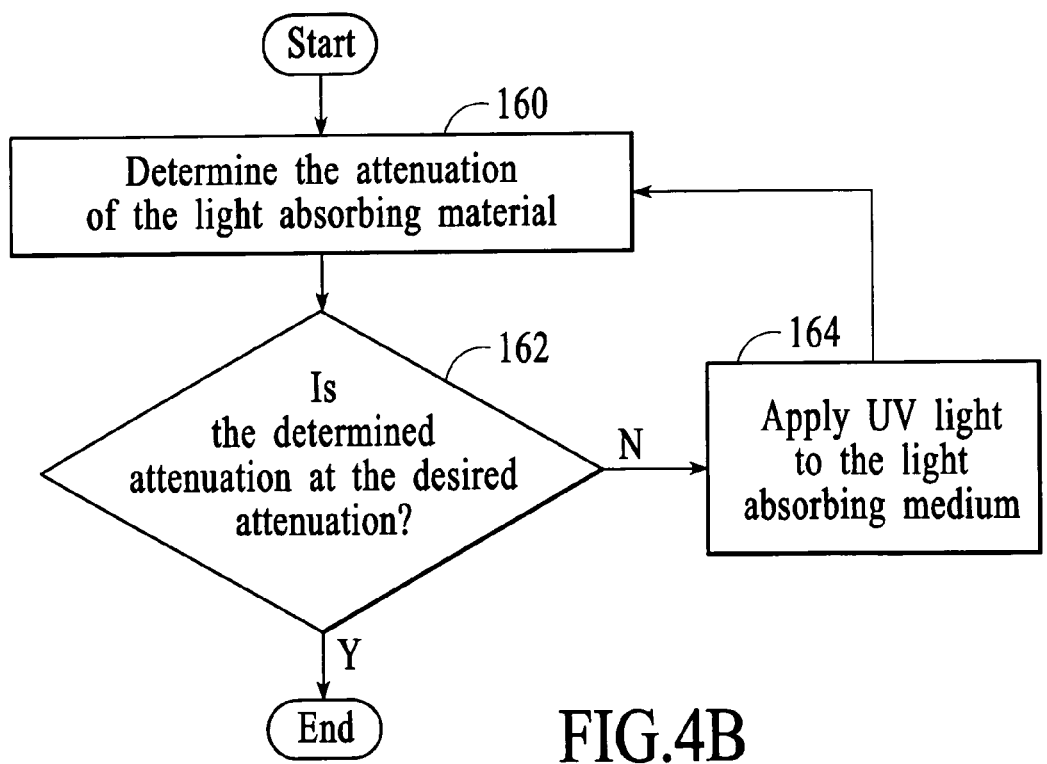
FIG. 4B depicts a process flow diagram of a method for setting the attenuation of a light absorbing medium as depicted in FIG. 4A.

A process flow diagram of a method for setting the attenuation of a light absorbing medium is provided in FIG. 4B. The process described with reference to FIG. 4B can be applied to the system of FIG. 4A. At block 160, the attenuation of the light absorbing medium is determined. For example, the attenuation is determined by obtaining input and output light intensity measurements. At decision point 162, it is determined if the attenuation is at the desired attenuation. If the attenuation is at the desired attenuation, then the process is ended and no more UV light is applied to the light absorbing medium. If the attenuation is not at the desired attenuation, then at block 164 UV light is applied to the light absorbing medium and the process returns to block 160. UV light can be continuously applied to the light absorbing medium or applied in a step-wise manner.

Although two systems for changing the attenuation of a UV light-dependent light absorbing medium are described, other systems are possible.

In an alternative embodiment, the attenuation of a light absorbing medium with a UV light-dependent absorption characteristic is changed from an initial attenuation to a desired attenuation by applying a pre-determined amount of UV light to the light absorbing medium. By applying a pre-determined amount of UV light, the attenuation of the light absorbing medium can be changed to the desired attenuation without using intensity measurements. The amount of UV light necessary to achieve the desired attenuation can be pre-determined based on, for example, previous results, testing, or calculations.

A light absorbing medium with a UV light-dependent absorption characteristic as described above can have many applications. Some exemplary applications are described with reference to FIGS. 5-10. FIG. 5 depicts an example of a light absorbing medium 100 with a UV light-dependent light absorption characteristic that is used in conjunction with a laser 170. In this application, the light absorbing medium is placed in an optical path of the laser's output beam 172 to attenuate the laser's output beam. As described above, UV light is applied to the light absorbing medium to change the attenuation of the light absorbing medium to a desired attenuation. UV light can be applied to the light absorbing medium before it is assembled with the laser or while it is in use with the laser.

FIG. 6 depicts an example of a light absorbing medium 100 with a UV light-dependent absorption characteristic that is used in conjunction with an LED 174. In this application, the light absorbing medium is formed as a lens directly over the LED. A light absorbing medium formed as a lens simultaneously performs the functions of focusing and attenuating the output light. FIG. 7 depicts an alternative embodiment of the light absorbing medium of FIG. 6 in which the light absorbing medium is formed as a layer over an LED lens 176. In either embodiment, the attenuation of the light absorbing medium is adjusted to the desired attenuation by the application of UV light. The attenuation of the light absorbing medium can be adjusted while the LED is generating light. Attenuation adjustments can be made to set the brightness of the LED. For example, the attenuation of the light absorbing medium can be adjusted on a per-LED basis to account for differences in LED efficiency within a batch of LEDs or on a per-batch basis to account for differences in LED efficiency from batch to batch.

FIG. 8 depicts an example of a light absorbing medium 100 with a UV light-dependent absorption characteristic that is used in conjunction with an LCD panel 178. In this application, the light absorbing medium is formed as a layer over a major surface of the LCD panel. The attenuation of the light absorbing medium is adjusted to the desired attenuation by the application of UV light. In an embodiment, the attenuation of the light absorbing medium is adjusted across the LCD panel to balance the light that is emitted by the LCD panel.

Figure 9:
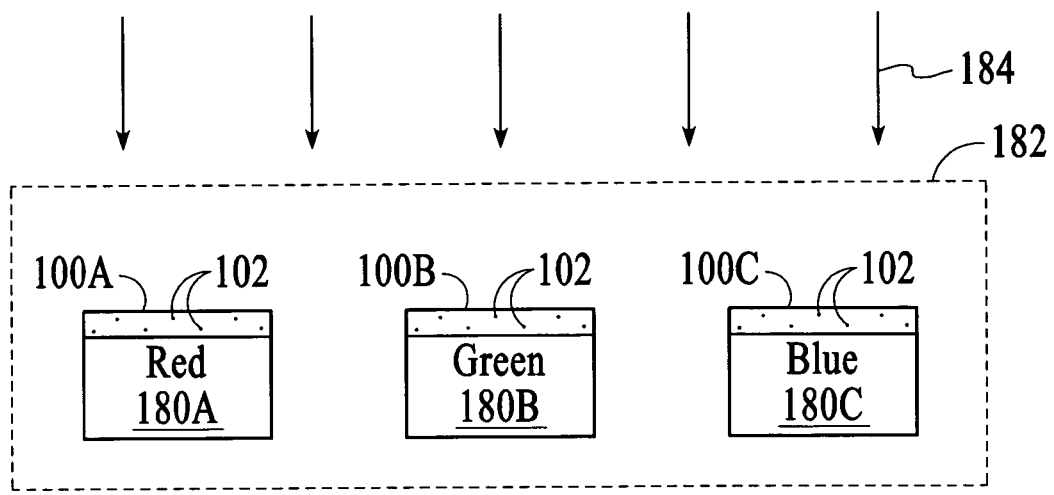
FIG. 9 depicts a light absorbing medium with a UV light-dependent absorption characteristic that is used in conjunction with a color-specific set of sensors of a CCD sensor array.

FIG. 9 depicts an example of a light absorbing medium with a UV light-dependent absorption characteristic that is used in conjunction with three individual color sensors 180A, 180B, 180C of a CCD sensor 182 (e.g., for use in a digital camera and commonly referred to as a "Three chip color camera"). In this application, a light absorbing medium 100A, 100B, 100C is formed over each color-specific sensor. The attenuation of each light absorbing medium is individually adjusted to the desired attenuation by the application of UV light. In an embodiment, the attenuation of each light absorbing medium is adjusted on a per-color basis to achieve fine color tuning for accurate color detection of incident light 184.

Figure 10:
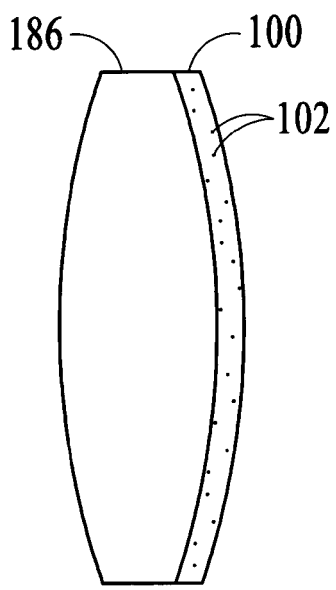
FIG. 10 depicts a light absorbing medium with a UV light-dependent absorption characteristic that is formed on the surface of an optical element such as a lens.

FIG. 10 depicts an example of a light absorbing medium 100 with a UV light-dependent absorption characteristic that is formed on the surface of an optical element 186 such as a lens. The attenuation of the light absorbing medium is adjusted to the desired attenuation by the application of UV light. In an embodiment, the lens is a camera lens and the attenuation is adjusted to set the filtering level of infra-red light.

Because of the UV dependency of the light absorbing medium 100, in most applications the light 114, 184 that is intended to be attenuated by the light absorbing medium should fall outside the UV band.

In an embodiment, the absorption of light can be used to change the color of the output light. For example, a light absorbing medium that outputs colored light (e.g., dark blue) can be changed by the application of UV light to output a different shade of the color (e.g., light blue).

Figure 11:
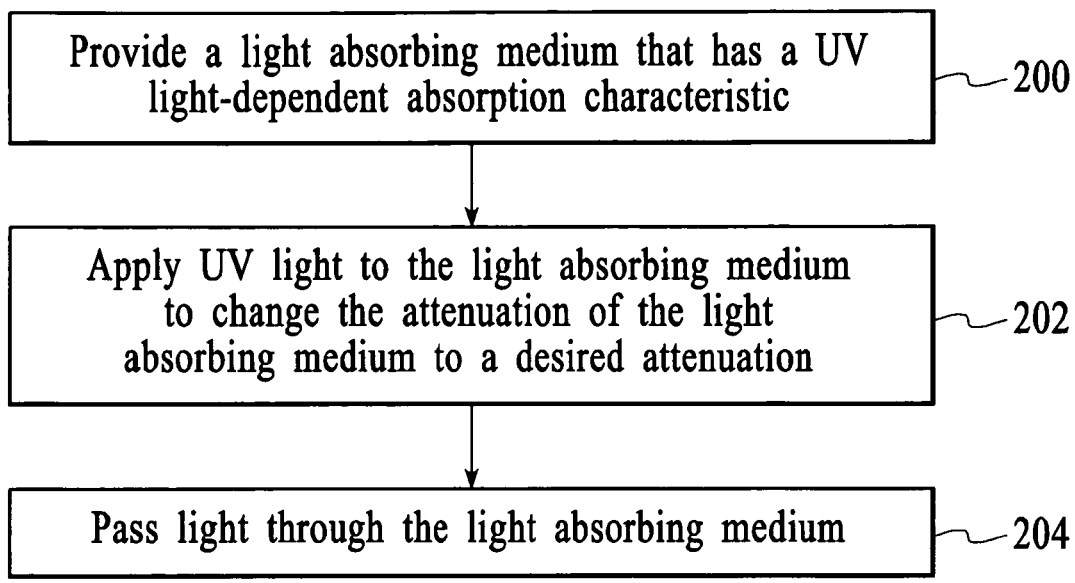
FIG. 11 is a process flow diagram of a method for attenuating light in accordance with an embodiment of the invention.

FIG. 11 is a process flow diagram of a method for attenuating light. At block 200, a light absorbing medium that has a UV light-dependent absorption characteristic is provided. At block 202, UV light is applied to the light absorbing medium to change the attenuation of the light absorbing medium to a desired attenuation. At block 204, light is passed through the light absorbing medium.

Figure 12:
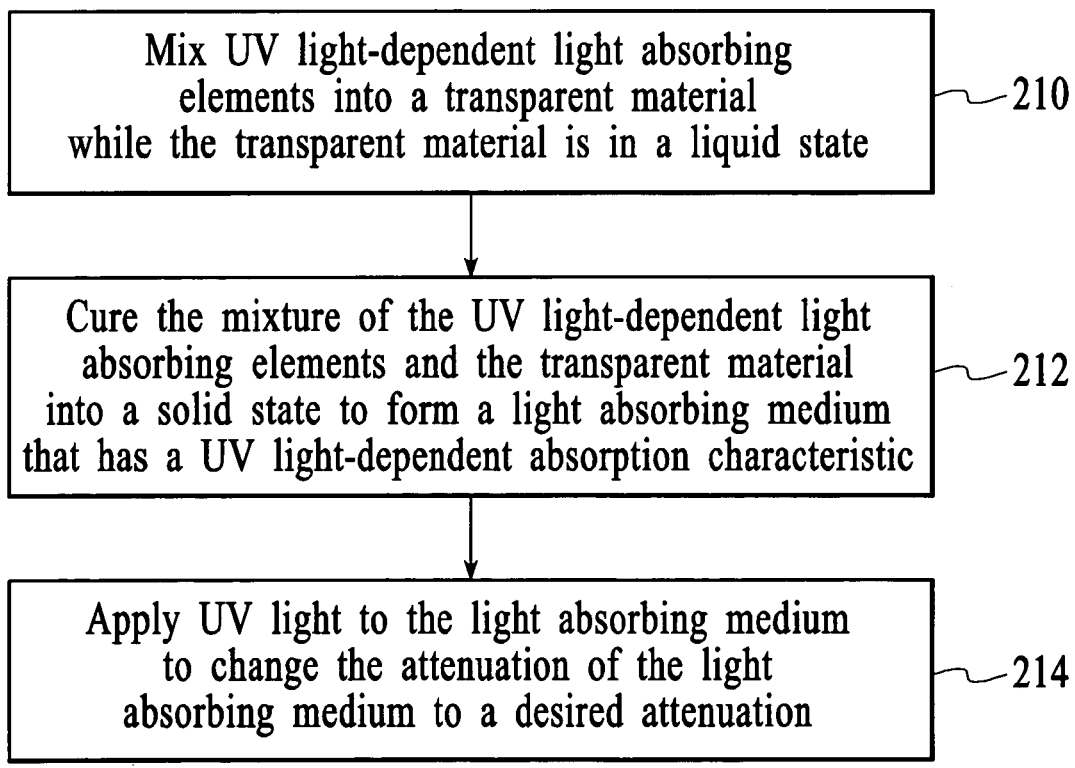
FIG. 12 is a process flow diagram of a method for producing a light absorbing medium having a desired attenuation in accordance with an embodiment of the invention.

FIG. 12 is a process flow diagram of a method for producing a light absorbing medium having a desired attenuation. At block 210, UV light-dependent light absorbing elements are mixed into a transparent material while the transparent material is in a liquid state. At block 212, the mixture of the UV light-dependent light absorbing elements and the transparent material is cured into a solid state to form a light absorbing medium that has a UV light-dependent absorption characteristic. At block 214, UV light is applied to the light absorbing medium to change the attenuation of the light absorbing medium to a desired attenuation.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical element comprising:
 a light absorbing medium comprising;
  a transparent material; and
  light absorbing elements encapsulated within the transparent material, wherein the light absorbing elements have an ultraviolet (UV) light-dependent absorption characteristic in which application of UV light to the light absorbing medium causes the UV light-dependent absorption characteristic of the light absorbing elements to be permanently altered such that the amount of light absorbed by the light absorbing medium is reduced.

2. The optical element of claim 1 further comprising a system for permanently reducing the attenuation of the light absorbing medium from an initial attenuation to a desired attenuation.

3. The optical element of claim 2 further comprising a UV light source and a controller configured to control the application of UV light to the light absorbing medium.

4. The optical element of claim 3 further comprising a light detector configured to detect light exiting the light absorbing medium.

5. The optical element of claim 1 wherein the transparent material is epoxy.

6. The optical element of claim 1 wherein the light absorbing elements include one of ink and colored powder dye.

7. The optical element of claim 1 further including a laser source configured to generate a light beam and oriented with reference to the light absorbing medium to pass the generated light beam through the light absorbing medium.

8. The optical element of claim 1 further including a light emitting diode, wherein the light absorbing medium is formed over the light emitting diode.

9. The optical element of claim 1 further including a liquid crystal display (LCD) panel, wherein the light absorbing medium is formed over a surface of the LCD panel.

10. The optical element of claim 1 further including an optical detector, wherein the light absorbing medium is formed over a surface of the optical detector.

11. The optical element of claim 1 further including a lens, wherein the light absorbing medium is formed over a surface of the lens.

12. A method for attenuating light comprising the steps of:
 providing a light absorbing medium comprising a transparent material and light absorbing elements encapsulated within the transparent material, wherein the light absorbing elements have a UV light-dependent absorption characteristic;

applying UV light to the light absorbing medium to permanently reduce the attenuation of the light absorbing medium to a desired attenuation, wherein the application of the UV light to the light absorbing medium causes the UV light-dependent absorption characteristic of the light absorbing elements to be permanently altered such that amount of light absorbed by the light absorbing medium is reduced; and passing light through the light absorbing medium.

13. The method of claim 12 further including:

measuring the intensity of the light that exits the light absorbing medium;

comparing the measured intensity to a desired intensity; and adjusting the application of the UV light to the light absorbing medium in response to the comparison.

14. The method of claim 13 further including ending the application of the UV light when the measured intensity matches the desired intensity.

15. The method of claim 12 further including:

measuring the intensity of the light before it passes through the light absorbing medium;

measuring the intensity of the light after it passes through the light absorbing medium;

determining the attenuation of the light absorbing medium in response to the measurements;

comparing the determined attenuation to a desired attenuation; and adjusting the application of the UV light to the light absorbing medium in response to the comparison.

16. The method of claim 15 further including ending the application of the UV light when the determined attenuation matches the desired attenuation.

17. The method of claim 12 wherein applying UV light to the light absorbing medium comprises applying a predetermined amount of UV light to the light absorbing medium.

18. A method for producing a light absorbing medium having a desired attenuation, the method comprising:

mixing UV light-dependent light absorbing elements into a transparent material while the transparent material is in a liquid state;

curing the mixture of the UV light-dependent light absorbing elements and the transparent material into a solid state to form a light absorbing medium that has a UV light-dependent absorption characteristic; and applying UV light to the light absorbing medium to permanently reduce the attenuation of the light absorbing medium to a desired attenuation, wherein the application of the UV light to the light absorbing medium causes the UV light-dependent absorption characteristic of the light absorbing elements to be permanently altered such that amount of light absorbed by the light absorbing medium is reduced.

19. The method of claim 18 further including:

passing light through the light absorbing medium;

measuring the intensity of the light that passes through the light absorbing medium;

comparing the measured intensity to a desired intensity; and adjusting the application of the UV light to the light absorbing medium in response to the comparison.

20. The method of claim 18 further including:

passing light through the light absorbing medium;

measuring the intensity of the light before it passes through the light absorbing medium;

measuring the intensity of the light after it passes through the light absorbing medium;

determining the attenuation of the light absorbing medium in response to the measurements;

comparing the determined attenuation to a desired attenuation; and adjusting the application of the UV light to the light absorbing medium in response to the comparison.

* * * * *